United States Patent
Nielsen

(10) Patent No.: US 11,437,825 B2
(45) Date of Patent: Sep. 6, 2022

(54) HYBRID RENEWABLE POWER PLANT

(71) Applicant: VESTAS WIND SYSTEMS A/S, Aarhus N (DK)

(72) Inventor: Per Hagen Nielsen, Tilst (DK)

(73) Assignee: VESTAS WIND SYSTEMS A/S, Aarhus N (DK)

( * ) Notice: Subject to any disclaimer, the term of this patent is extended or adjusted under 35 U.S.C. 154(b) by 0 days.

(21) Appl. No.: 17/420,895

(22) PCT Filed: Dec. 30, 2019

(86) PCT No.: PCT/DK2019/050424
§ 371 (c)(1),
(2) Date: Jul. 6, 2021

(87) PCT Pub. No.: WO2020/141009
PCT Pub. Date: Jul. 9, 2020

(65) Prior Publication Data
US 2022/0102984 A1  Mar. 31, 2022

(30) Foreign Application Priority Data
Jan. 4, 2019 (DK) .......................... PA 2019 70008

(51) Int. Cl.
*H02J 3/46* (2006.01)
*H02S 10/12* (2014.01)
*H02J 3/38* (2006.01)

(52) U.S. Cl.
CPC ............... *H02J 3/46* (2013.01); *H02J 3/381* (2013.01); *H02S 10/12* (2014.12); *H02J 2300/24* (2020.01); *H02J 2300/28* (2020.01)

(58) Field of Classification Search
CPC ...................................................... H02J 3/46
See application file for complete search history.

(56) References Cited

U.S. PATENT DOCUMENTS

| 9,543,859 B2* | 1/2017 | Eren ................ H02M 7/53871 |
| 10,599,175 B1* | 3/2020 | Wells ................ H02J 13/00017 |
| 2005/0010309 A1* | 1/2005 | Baba ..................... G05B 13/042 700/28 |
| 2010/0198421 A1* | 8/2010 | Fahimi ..................... H02J 3/32 700/291 |

(Continued)

FOREIGN PATENT DOCUMENTS

| EP | 3068007 A1 | 9/2016 |
| EP | 3322061 A1 | 5/2018 |
| WO | 2020141009 A1 | 7/2020 |

OTHER PUBLICATIONS

Danish Patent and Trademark Office 1st Technical Examination for Application No. PA 2019 70008 dated Jul. 10, 2019.

(Continued)

Primary Examiner — Daniel Kessie
(74) Attorney, Agent, or Firm — Patterson + Sheridan, LLP

(57) ABSTRACT

A renewable power plant configured to deliver electrical power to an electrical grid in accordance with a reference is disclosed. The renewable power plant comprises at least one energy generating system of a first type, at least one energy generating system of a second type, and a control system including a central power plant controller (CPPC) which generates setpoints for controlling the energy generating systems in accordance with the reference. The energy generating systems provide feedback signals to the CPPC. The control system is configured to generate a modified feedback signal based on the feedback signal received from the energy generating systems of the second type, and using a model representing operational behavior of the energy generating systems of the second type. The CPPC is configured to apply the modified feedback signal to a feedback control loop for controlling the energy generating systems.

12 Claims, 7 Drawing Sheets

(56) References Cited

U.S. PATENT DOCUMENTS

| | | | |
|---|---|---|---|
| 2011/0130889 A1* | 6/2011 | Khajehoddin | H02J 3/381 |
| | | | 700/298 |
| 2012/0083935 A1 | 4/2012 | Wells | |
| 2012/0224403 A1* | 9/2012 | Wu | H02M 7/5395 |
| | | | 363/132 |
| 2014/0249653 A1* | 9/2014 | Blevins | G05B 13/048 |
| | | | 700/21 |
| 2015/0219074 A1 | 8/2015 | Babazadeh et al. | |
| 2016/0036229 A1* | 2/2016 | Shao | H02J 3/382 |
| | | | 700/286 |
| 2016/0111883 A1 | 4/2016 | Beekmann et al. | |
| 2016/0156190 A1* | 6/2016 | Wells | H02J 3/382 |
| | | | 307/18 |
| 2016/0349717 A1* | 12/2016 | Tadano | H02J 3/01 |
| 2017/0346286 A1* | 11/2017 | Wells | H02J 3/24 |
| 2017/0346291 A1* | 11/2017 | Wells | H02J 13/00 |
| 2018/0278057 A1 | 9/2018 | Wells et al. | |
| 2018/0313325 A1* | 11/2018 | Gordic | H02K 7/1823 |
| 2018/0358812 A1* | 12/2018 | Anderson | H02J 13/00034 |
| 2019/0032628 A1* | 1/2019 | Karousos | H02K 7/1807 |
| 2020/0293703 A1* | 9/2020 | Gu | G06F 30/20 |

OTHER PUBLICATIONS

PCT International Search Report for Application No. PCT/DK2019/050424 dated Feb. 24, 2020.

PCT Written Opinion of the International Searching Authority for Application No. PCT/DK2019/050424 dated Feb. 24, 2020.

\* cited by examiner

HYBRID RENEWABLE POWER PLANT

FIELD OF INVENTION

The present invention relates to a renewable power plant comprising energy generating systems of at least two different types. The invention further relates to a method for controlling the renewable power plant.

BACKGROUND OF THE INVENTION

Renewable energy is becoming an extremely important source of electrical energy. Wind turbines are currently the most used renewable generators. However, over the past years, many other sources, exploiting other natural energy resources such as sunlight, rain, tides, geothermal heat, and waves are also playing an important role in power production. Power generators exploiting different types of natural resources may be combined into one power plant delivering total generated power to an electrical grid. Such power plants are often referred to as hybrid renewable power plants. When delivering power to the electrical grid, requirements related to the generated power are set by the electrical grid and grid operators. These requirements must be met, e.g. in order to ensure stability of the grid. Requirements set by the electrical grid, also known as grid codes, specify parameters which a power plant (e.g. a renewable power plant) connected to the electrical grid must meet to ensure proper functioning of the electrical grid. This can for example be specifications on voltage regulation, power factor limits and reactive power supply, power ramp rate limits, overshoot limits and how fast the power plant need to react to changes in a reference from a grid operator. Requirements set by the grid operators, also known as references, on the other hand, specify commands based on which the power plant operates.

Furthermore, when delivering power to the electrical grid, the hybrid renewable power plant needs to coordinate between power generators exploiting different types of natural resources to ensure optimal power production and stability of the electrical grid. In order to achieve optimal coordination between the power generators exploiting different types of natural resources, proper communication between those is required. Coordination between power generators ensures that requirements set by the electrical grid and/or grid operator are met on time.

WO 2014/102706 relates to a method for operating a renewable energy power plant through improved communication, and to a system therefor. Improved communication is achieved using multiple antennas, beam steering antennas, antenna mounting methods, dynamic power adjustment, and heterogeneous wired and wireless communication configuration. However, multiple additional equipment increases physical complexity of an already complex system, risk of failure increases, as well as need for maintenance of the equipment. Furthermore, a complex system introduces communication delays which are not desired in the hybrid renewable power plants.

DESCRIPTION OF THE INVENTION

It is an object of embodiments of the invention to provide a renewable power plant which ensures optimal coordination between energy generating systems of different types by using current setup of the renewable power plant.

It is a further object of embodiments of the invention to provide a renewable power plant in which coordination between energy generating systems is performed fast.

It is an even further object of embodiments of the invention to provide a renewable power plant which is capable of reacting promptly to changes in a reference.

It is an even further object of embodiments of the invention to provide a hybrid renewable power plant in which energy generating systems of various kinds can be controlled using a feedback control loop without introducing additional equipment.

According to a first aspect, the invention provides a renewable power plant configured to deliver electrical power to an electrical grid in accordance with a reference, the renewable power plant comprising:

at least one energy generating system of a first type,
at least one energy generating system of a second type, the energy generating systems of the first type and of the second type being configured to generate and deliver energy to the electrical grid,
a control system comprising a central power plant controller (CPPC) communicating with the energy generating systems via a communication network, the CPPC being configured to generate setpoints for controlling the energy generating systems in accordance with the reference and to communicate the setpoints to the energy generating systems,
the energy generating systems being configured to generate feedback signals related to the energy generating systems and communicate them to the CPPC, and wherein the energy generating system of the second type introduces a time delay, the feedback signal originating from the energy generating system of the second type thereby comprising the time delay, wherein the control system is configured to generate a modified feedback signal based on the feedback signal received from the energy generating systems of the second type, and using a model representing operational behaviour of the energy generating systems of the second type, the modified feedback signal representing the feedback signal without the time delay, and wherein the CPPC is configured to apply the modified feedback signal to a feedback control loop for controlling the energy generating systems.

Thus, according to the first aspect, the invention provides a hybrid renewable power plant comprising at least energy generating systems of the first type and of the second type. The energy generating systems of the second type introduces a time delay which is compensated for through the feedback control loop.

A renewable power plant s a power plant in which energy generators are renewable energy generators producing renewable energy from renewable resources, such as wind, sunlight, waves, tides, rain, geothermal heat, and similar. The renewable power plant may comprise a plurality of renewable energy generators, each of the energy generators generating a certain amount of energy and contributing to the total energy production of the renewable power plant. The renewable power plant then delivers this energy further in the form of electricity. Produced electricity is then delivered to an electrical grid. Also, multiple renewable power plants may be connected to the electrical grid.

An electrical grid represents a network for distribution and delivery of electrical power from the renewable power plant to consumers. The electrical grid should be capable of receiving the energy generated by the renewable power plant and distributing the energy without any fluctuations and disturbances. The electrical grid may operate at a predetermined voltage and frequency, and the renewable power plant should operate according to these in order to avoid mismatch with the electrical grid.

The renewable power plant delivers electrical power to the electrical grid in accordance with a reference. In the present context, the reference can be interpreted as a value related to operational parameters such as an active power, reactive power, power factor, frequency, or voltage which the renewable power plant needs to achieve. The reference may be set by a grid operator/owner which may send it to the renewable power plant. The renewable power plant then operates in such a manner to meet the request set by the grid operator. Alternatively, the reference may be based on measurements on the electrical grid. The reference is typically communicated to a central power plant controller (CPPC) which then controls the renewable power plant, in particular the energy generating systems of the renewable power plant, accordingly. All the reference values may have requirements of a predefined response time, e.g. a rise time of 1 sec, and a predefined accuracy level, e.g. an overshoot of maximum 5%. The present invention ensures that the hybrid renewable power plan generates power within the predefined response time and with the predefined accuracy level.

The renewable power plant comprises at least one energy generating system of a first type, at least one energy generating system of a second type, and a control system. The energy generating systems generate electrical power and further deliver it to the electrical grid. The energy generating systems of the first and second types comprise one or more energy generators. The energy generating systems may further comprise various equipment for controlling the energy generators and equipment for communication with the control system. The energy generators may individually produce energy by exploiting one or more renewable resources and contributing to the total energy produced by the renewable power plant. Based on the resource, the energy generators may be of a different type, such as wind turbines, photovoltaic panels, wave power generators, etc. In one embodiment of the invention, the energy generators belonging to the energy generating system of the first type are not the same type as the energy generators belonging to the energy generating system of the second type. For instance, the energy generators belonging to the energy generating system of the first type can be wind turbines while the energy generators belonging to the energy generating system of the second type can be photovoltaic panels. Alternatively, or additionally, the energy generators belonging to the energy generating system of the first type may be manufactured by a party which is not the same as the manufacturer of the energy generators belonging to the energy generating system of the second type.

The control system communicates with the energy generating systems via a communication network. The control system is responsible for controlling the renewable power plant and may further be responsible for communication between the renewable power plant, electrical grid and grid operator(s)/owner(s). The main part of the control system is a central power plant controller (CPPC).

The communication network establishes a communication link between the control system and the energy generating systems. The communication network may be used for sending information both ways, i.e., from the control system to the energy generating systems and vice versa. The communication network may be used for, e.g., sending commands related to energy production, such as setpoints, from the control system to the energy generating systems, and for communicating reports about energy produced by the energy generators, such as produced power from the energy generating systems to the control system. The communication network may comprise communication cables which carry communication information. Alternatively or additionally, the communication network may apply wireless communication technology.

The CPPC is configured to generate setpoints for controlling the energy generating systems and energy generators of the renewable power plant in accordance to the reference. It may comprise a number of computers which continuously control operational parameters, monitor operating conditions, and collect statistics of energy generating systems of the power plant. The CPPC may control measurements of outside air temperature, temperature in electronic cabinets of the energy generating systems, parameters which are relevant to the power production, such as wind speed, wind direction, solar influx, etc. and many other parameters relevant for the power plant operation. The CPPC may also retrieve settings of the energy generating systems at any time. Furthermore, the CPPC may detect possible failures occurring within the communication network. The CPPC is configured to communicate setpoints to the energy generating systems.

The CPPC further communicate the setpoints directly to the energy generators of the energy generating systems. The setpoints may define operational parameters for the energy generators, such as defining active power required to be delivered by an energy generator, defining a power factor expected from the energy generator, defining reactive power required to be delivered by the energy generator, etc. The control system, therefore, receives the reference from, e.g., the grid operator and communicates it to the CPPC. The CPPC then calculates the setpoints for each individual energy generating system and each energy generator within the energy generating systems in accordance to the reference.

The energy generating systems are configured to generate feedback signals related to the energy generating systems. The feedback signal may comprise information about, e.g., energy produced by the energy generating system at a given time and may be sent via the communication network to the CPPC. Typically, the feedback signal relates to the same parameter as the setpoint, and thereby the feedback signal provides information regarding to which extent a given energy generating system complies with a given setpoint.

According to the invention, the energy generating system of the second type introduces a time delay. The time delay represents a time interval which the energy generating system of the second type uses before it generates electrical power according to the received setpoints, i.e., the actual power generated is delayed. Namely, when an altered setpoint, e.g. related to power, is sent to the energy generating system of the second type, then the output of the energy generating system of the second type will change only after the time delay has lapsed, as the energy generating system introduces this time delay. The time delay may be introduced by communication equipment forming part of the energy generating system of the second type. Furthermore, the time delay may result from different sampling rates between the CPPC and the energy generating system of the second type, i.e., its energy generators. Typically, the energy generating system of the second type and its control system has a higher sampling rate compared to the CPPC. However, this bandwidth advantage may be lost as the CPPC is limiting this bandwidth causing the time delay. The time delay, thus, prevents the energy generating systems of the second type from reacting promptly and on time to changes in the reference. The feedback signal is generated as the energy generating system of the second type generates power. Since the feedback signal relates to the generated power, the feedback signal comprises the time delay when sent to the control system.

The control system is configured to generate a modified feedback signal based on the feedback signal received from the energy generating systems of the second type. The control system, i.e., the CPPC receives the feedback signal and uses a model representing operational behaviour of the energy generating systems of the second type to calculate the modified feedback signal. Once generated, the modified feedback signal represents the feedback signal without the time delay. Thus, the modified feedback signal is what the feedback signal would have been if no time delay would have been present in the energy generating systems of the second type. The CPPC is configured to then apply the modified feedback signal to a feedback control loop for controlling the energy generating systems, thereby compensating for the time delay introduced by the energy generating system of the second type.

The model representing operational behaviour of the energy generating system of the second type may be implemented in the CPPC. The model representing operational behaviour may include functions which may use input from the CPPC about resources available for operation of the energy generating system of the second type. The model can predict how the energy generating system of the second type will behave based on the setpoint communicated to the energy generating system of the second type. In an embodiment of the invention, the model can predict how much power (active and/or reactive) the energy generating system of the second type will generate given the power setpoint as well as the resources. This may be seen as an ideal operational scenario expected from the energy generating system of the second type. The CPPC may then compare the modelled operational behaviour of the energy generating system of the second type with the received feedback signal to generate the modified feedback signal in which the time delay is compensated for.

By using the control system configured to generate the modified feedback signal, based on the feedback signal and using the model representing operational behaviour of the energy generating systems of the second type, and applying it to the feedback control loop for controlling the energy generating systems, the requirements of the electrical grid can be met. Additionally, the control system alone compensates for the time delay, i.e., without a need for additional external components. Thereby, a fast and simple system for time delay compensation is achieved, and a simple feedback control loop can be used. Possible failures within the control system can easily be repaired as they are contained within the control system. Furthermore, the present invention ensures that the hybrid renewable power plan generates power within the predefined response time and with the predefined accuracy level. Namely, there is no overshoot in the response from the renewable power plant or the overshoot is minimized to an acceptable level defined by the grid code. For instance, if the predefined response time is 1 sec, and predefined accuracy level is 97% and an introduced time delay is 0.16 sec, the modified feedback signal will ensure that appropriate setpoints are generated ensuring compliance with the reference requirements and thereby the requirements of the electrical grid.

Furthermore, in the hybrid power plant of the invention, energy generating systems of various types can be controlled using the same simple feedback control loop, without introducing additional equipment for compensation for time delays occurring in one or more of the types of energy generating systems.

In one embodiment, the control system may be equipped with a power measurement device which measures active and/or reactive power generated by the energy generating system in real time. The power measurement device may, e.g., measure power at a busbar connecting the energy generating system and the control system. In this embodiment, the measurement obtained by the power measurement device is the feedback signal. The feedback signal, i.e., the measured power, which comprises a time delay, is communicated to the CPPC. The CPPC may run a power-loop algorithm which receives the measured power from the power measurement device. The CPPC then calculates the modified feedback signal based on the received power measurement and using a model representing operational behaviour of the energy generating system of the second type. The modified feedback signal is applied to the power-loop algorithm which further computes the setpoints (e.g. active or reactive power setpoints) in accordance with the reference and communicates them to the energy generating systems for their control. In this manner the time delay introduced by the energy generating system of the second type is compensated for.

The energy generating system of the first type may comprise a wind turbine generator. Usually, the energy generating system of the first type comprising at least one wind turbine generator does not introduce any time delay or a time delay possibly introduced is minor and does not need to be compensated for. This may be due to the wind turbine generators being directly controlled by the CPPC, and therefore there is no delay in communicating the setpoints. Additionally or alternatively, the CPPC may be synchronized with the operation of the wind turbine generators comprised in the energy generating system of the first type and thereby the time delay will not be introduced. Namely, both the CPPC and the energy generating system of the first type may use samplers with the same sampling rate, and which are synchronized. In an alternative embodiment, the energy generating system of the first type may comprise photovoltaic generators, or batteries, or wave power generators. In this embodiment, the CPPC is synchronized with the generators comprised in the energy generating system of the first type.

The energy generating system of the second type may comprise a photovoltaic generator. The photovoltaic generators exploit energy from the sun to generate electricity. Alternatively, the energy generating system of the second type may comprise a battery, a wind turbine, or a wave power generator. The renewable power plant may also comprise energy generating systems of a third type, fourth type, etc. Each type of the energy generating system typically comprises energy generators which exploit energy from the same natural source. Energy generators comprised in the energy generating systems or the second, third, or forth type may be different from the energy generators of the first type. Alternatively, energy generators comprised in the energy generating systems or the second, third, or forth type may be manufactured by a party which is different from a manufacturer of the energy generators of the first type.

The energy generating system of the second type may comprise at least one local controller, the local controller being configured to control the energy generating systems of the second type and being further configured to communicate with the CPPC via the communication network. The local controller may control energy generators within the energy generating system. It may also comprise a number of computers which continuously control operational parameters, monitor operating conditions, and collect statistics of energy generators within the energy generating system. The local controller may be connected to sensors which measure outside air temperature, temperature in electronic cabinets of the energy generators within the energy generating system of the second type, parameters which are relevant for the power production, such as solar influx, or other parameters relevant for particular energy generators. Furthermore, the local controller may detect possible failures occurring within the energy generators. Alternatively or additionally, the energy generating system of the first type may comprise a local controller. This local controller may be synchronized with the CPPC. It may, e.g., check rotational speed of a rotor of a wind turbine generator, its voltage and current, and receive measured values of wind speed and wind direction, and possibly humidity, precipitation, gust condition etc. If the renewable power plant comprises third, fourth, etc. energy generating system, each of the systems may comprise its own local controller.

The control system may comprise a time delay predictor algorithm configured to determine the time delay based on the feedback signal received from the energy generating systems of the second type, preferably further based on the model representing operational behaviour of the energy generating systems of the second type. The modified feedback signal may then be the feedback signal in which the calculated time delay is subtracted. The time delay predictor algorithm may be run on the CPPC and may be configured to calculate a delay introduced in communication between the local controller of the energy generating system of the second type and the CPPC, as well as a delay introduced by the communication network interconnecting the energy generating system of the second type and the CPPC.

The reference may include at least one of a power reference, voltage reference, power factor reference, active power reference, and reactive power reference. The renewable power plant may be required to operate at a fixed power factor. The fixed value for the power factor may be changed occasionally, for example for winter and summer, or peak and no-load periods. In some scenarios, the renewable power plant may have to adjust its reactive power production in order to fulfil requirement from the grid operator expressed in the voltage reference.

The CPPC may further calculate new setpoints for the at least one energy generating system of the second type. The new setpoints also comply with the reference. Once the modified feedback signal is calculated and applied to the feedback control loop, the new setpoints may be calculated based on the reference and the modified feedback signal itself. The new setpoints together with the modified feedback signal ensure a proper response of the renewable power plant to the requirements of the electrical grid.

The time delay may be a constant value. The time delay may only depend on the configuration of the communication network and operational parameters of the energy generating system of the second type. If there is no change in the communication network and the operational parameters then there will be no change in the time delay. The time delay being a constant may simplify calculation of the modified feedback signal as there will be no need to calculate the time delay itself, but rather only apply the constant time delay value to the signal generated by the model representing operational behaviour of the energy generating system of the second type.

In one embodiment of the invention, the CPPC may be configured to apply the feedback signals received from the energy generating systems of the first type to the feedback control loop for controlling the energy generating systems of the first type. Namely, the energy generating system of the first type may be controlled directly by its original feedback signal. As the energy generating systems of the first type may not introduce any time delay or it is sufficiently small, so there is no need to compensate for the delay in order to comply with the requirements of the electrical grid. In this case then there is no generation of the modified feedback signal and the feedback signal is used directly within the feedback control loop. Namely, the feedback control loop is used for both types of energy generating systems, for the energy generating system of the first type the feedback signal is used directly while for the energy generating system of the second type the modified signal is used.

According to a second aspect, the invention provides a method for operating a renewable power plant configured to deliver electrical power to an electrical grid in accordance with a reference, the renewable power plant comprising:
  at least one energy generating system of a first type,
  at least one energy generating system of a second type, the energy generating systems of the first type and of the second type being configured to generate and deliver energy to the electrical grid,
  a control system comprising a central power plant controller (CPPC) communicating with the energy generating systems via a communication network,
wherein a time delay is introduced by the energy generating system of the second type,
the method comprising the steps of:
  the energy generating systems generating feedback signals related to the energy generating systems, the feedback signal originating from the energy generating systems of the second type comprising the time delay,
  the energy generating systems communicating the feedback signals to the CPPC,
  the control system generating a modified feedback signal based on the feedback signal received from the energy generating systems of the second type and using a model representing operational behaviour of the energy generating systems of the second type, the modified feedback signal representing the feedback signal without the time delay,
  the CPPC applying the modified feedback signal to a feedback control loop for controlling the energy generating systems, and
  the CPPC generating setpoints for controlling the energy generating systems in accordance with the reference and communicating the setpoints to the energy generating systems.

The method according to the second aspect of the invention may be performed by the renewable power plant according to the first aspect of the invention and its control system. The skilled person would therefore readily understand that any feature described in combination with the first aspect of the invention could also be combined with the second aspect of the invention, and vice versa. Accordingly, the remarks set forth above with reference to the first aspect of the invention are equally applicable here.

The method may further comprise the step of the control system determining the time delay based on the feedback signal received from the energy generating systems of the second type, preferably further based on the model representing operational behaviour of the energy generating systems of the second type.

The method may further comprise the step of the CPPC applying the feedback signal received from the energy generating systems of the first type to the feedback control loop thereby controlling the energy generating systems of the first type.

BRIEF DESCRIPTION OF THE DRAWINGS

The invention will now be described in further detail with reference to the accompanying drawings in which FIG. 4b shows a graph representing response to a change in reactive power reference for the renewable power plant of FIG. 4a.

DETAILED DESCRIPTION OF THE DRAWINGS

Figure 1:
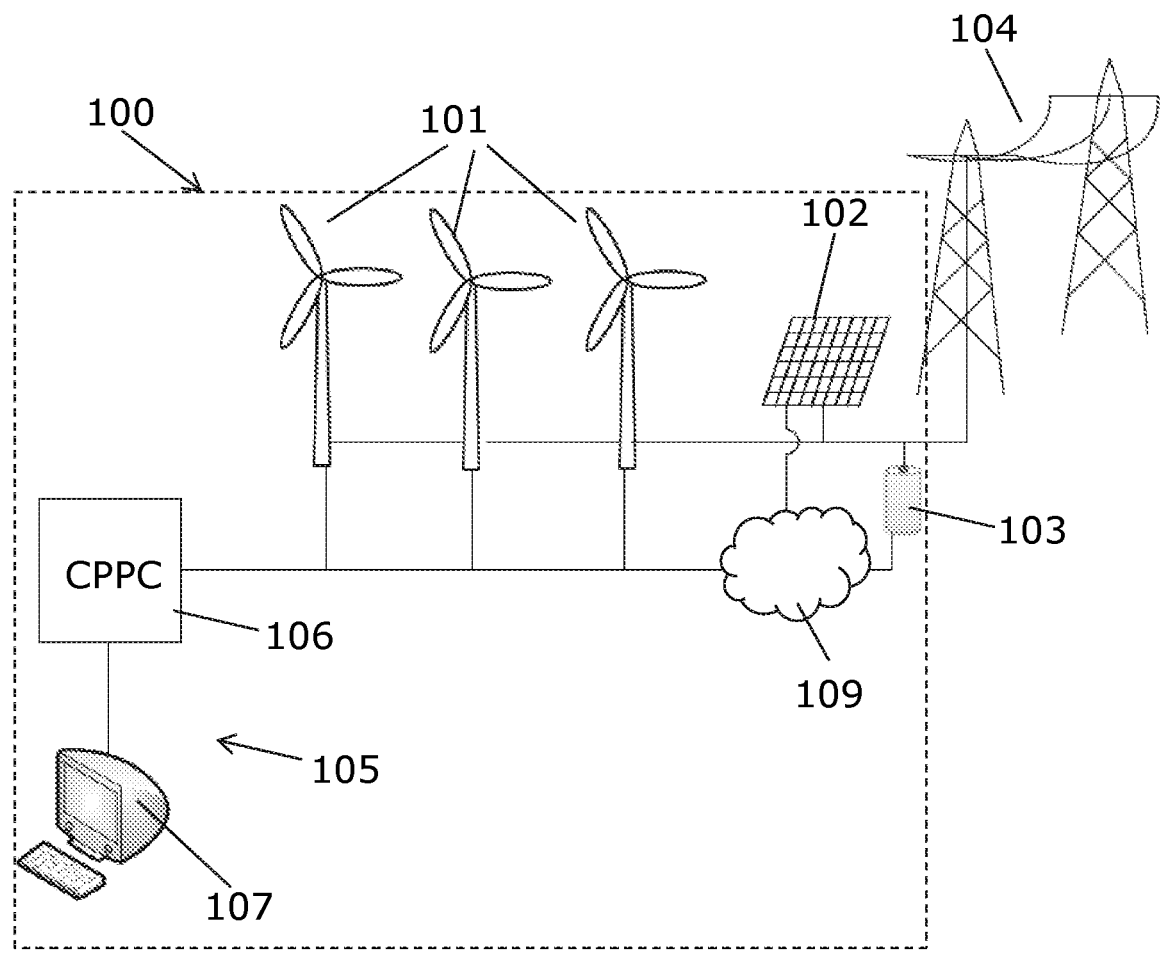
FIG. 1 illustrates a renewable powerplant according to one embodiment of the present invention.

FIG. 1 illustrates a renewable power plant 100 according to one embodiment of the present invention. The renewable power plant 100 is configured to deliver electrical power to an electrical grid 104 in accordance with a reference. In this embodiment, the renewable power plant 100 is connected to an electrical grid 104. The renewable power plant 100 comprises five energy generating systems 101, 102, and 103, and a control system 105. The energy generating systems 101, 102, 103 are configured to generate and deliver energy to the electrical grid 104. The control system 105 comprises a central power plant controller 106. The computer 107 represents the possibility of the operator and/or owner of the renewable power plant 100 to send commands and updates to the control system.

All three energy generating systems of a first type 101 comprise a wind turbine generator. The energy generating system of a second type 102 comprises a photovoltaic panel, and the energy generating system of a third type 103 comprises a battery. The energy generating systems of the second and third type, 102 and 103, are connected to the CPPC 106 via a communication network 109. In the shown setup, a time delay may be introduced by the energy generating system 102, 103 and/or by the communication network 109. The energy generating systems of the first type 101 are shown as directly connected to the CPPC 106 thus, the time delay introduced by the communication between the CPPC 106 and the energy generating systems of the first type 101 is negligible.

The CPPC 106 is configured to communicate setpoints to the energy generating systems 101, 102, 103. The setpoints are determined in accordance with the reference. Thus, if the reference is an active or reactive power reference, then the setpoints communicated to the energy generating systems 101, 102, 103 will try to ensure that the active or reactive power delivered to the electrical grid 104 complies with the active or reactive power reference. The energy generating systems 101-103 are configured to generate feedback signals related to the energy generating systems 101-103 and communicate them to the CPPC 106. This will become more apparent in the description below, referring to FIGS. 2a-4b.

Figure 2A:
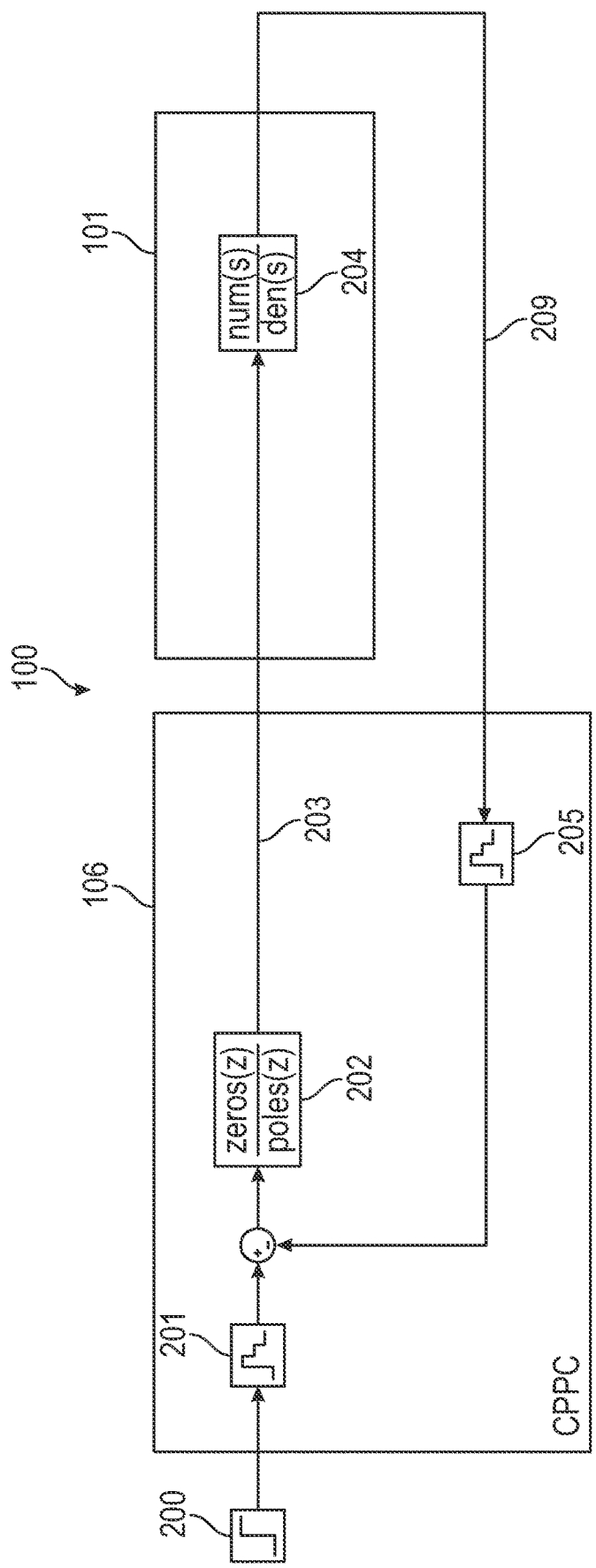
FIG. 2a shows a feedback control loop as a part of a prior art renewable power plant.

FIG. 2a shows a feedback control loop as a part of a prior art renewable power plant 100 comprising a CPPC 106 and an energy generating system. The feedback control loop as shown in FIG. 2a may be used for any energy generating system where the time delay is negligible. In the figure, it is shown as the energy generating system of the first type 101 as it does not introduce any significant time delay. The CPPC 106 receives a reference 200 from a grid operator. The reference 200 is a value related to operational parameters such as required active power, reactive power, power factor, etc. The reference 200 is sampled in a sampler 201 and communicated further to a feedback control loop algorithm 202. The feedback control loop algorithm 202 also receives a feedback signal 209 from the energy generating system of the first type 101 obtained by a power measurement device 205. The feedback signal 209 reflects the actual power delivered by the energy generating system 101.

The feedback control loop algorithm 202 then calculates setpoints 203, based on the feedback signal 209 and the reference 200, and the calculated setpoints 203 are communicated to the energy generating system of the first type 101. The setpoints 203 are received by a local controller 204 which controls the energy generating system of the first type 101. As mentioned above, in this prior art scenario, the energy generating system of the first type 101 only introduces negligible time delay and the setpoints are generated directly based on the feedback signal 209 and the reference 200.

Figure 2B:
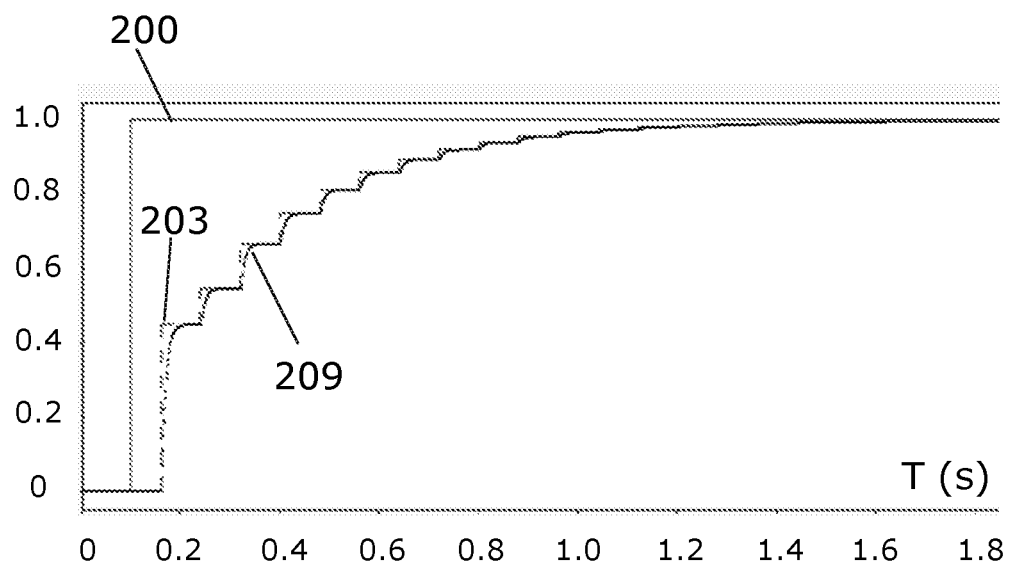
FIG. 2b shows a graph representing response to a change in reactive power reference for the renewable power plant of FIG. 2a, FIG. 3a shows a feedback control loop as a part of an alternative prior art renewable power plant.

FIG. 2b shows a graph representing response to a change in reactive power reference for the renewable power plant of FIG. 2a to the reference 200. The reference 200 defines a reactive power value which the power plant 100 needs to achieve within a predetermined time. The reference could also be a voltage, frequency response or active power value, but in this example a reactive power value is used. In this example, the predetermined time is set to be 1 sec, thus the renewable power plant needs to output at the 97% of the reactive power reference value within 1 sec as only 5% overshoot is allowed by a grid code. The graph shows three curves, curve 200 representing the reference, curve 203 representing the setpoints sent to the energy generating system of the first type 101, and curve 209 representing a response of the energy generating system of the first type 101 to the setpoints 203, i.e., the feedback signal. It can be seen that in this prior art scenario with the energy generating system introducing negligible time delay, the energy generating system of the first type 101 provides the required reactive power within the required response time.

Figure 3A:
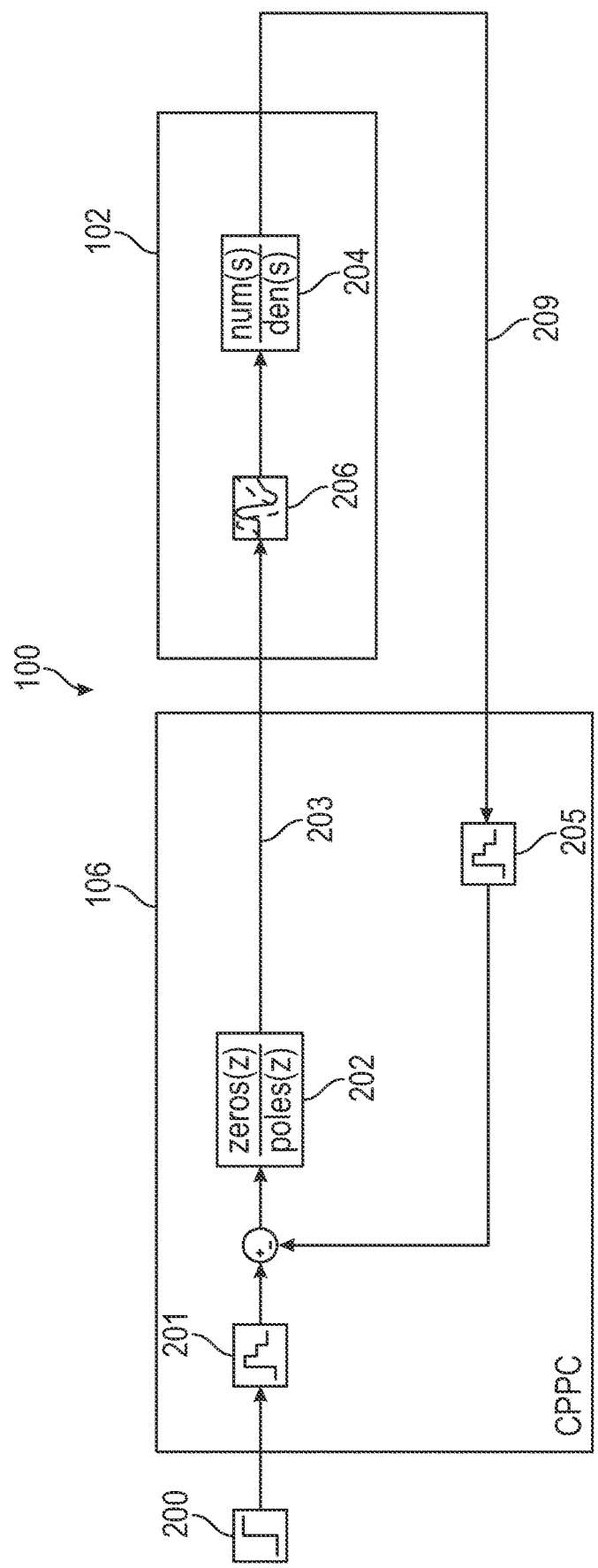
FIG. 3b shows a graph representing response to a change in reactive power reference for the renewable power plant of FIG. 3a, and FIG. 4a shows a feedback control loop as a part of a renewable power plant according to an embodiment of the present invention.

FIG. 3a shows a feedback control loop as a part of an alternative prior art renewable power plant 100 comprising a CPPC 106 and an energy generating system of a second type 102. The energy generating system of the second type 102 introduces a time delay, represented with a block 206. The CPPC 106 receives a reference 200 from a grid operator which is sampled in a sampler 201 and communicated further to a feedback control loop algorithm 202. The feedback control loop algorithm 202 also receives a feedback signal 209 from the energy generating system of the second type 102 obtained by a power measurement device 205. Also in this case, the feedback signal 209 reflects the actual power delivered by the energy generating system 102. However, in the embodiment of FIG. 3a, the feedback signal 209 includes the introduced time delay 206.

The feedback control loop algorithm 202 then calculates setpoints 203, based on the feedback signal 209, including the time delay 206, and the reference 200. The calculated setpoints 203 are communicated to the energy generating system of the second type 102. The setpoints 203 are received by a local controller 204 which controls the energy generating system of the second type 102. In this prior art scenario, the energy generating system of the second type 102 introduces the time delay 206 and the setpoints are generated in the same manner as in the above described prior art, i.e., directly based on the feedback signal 209 and the reference 200.

Figure 3B:
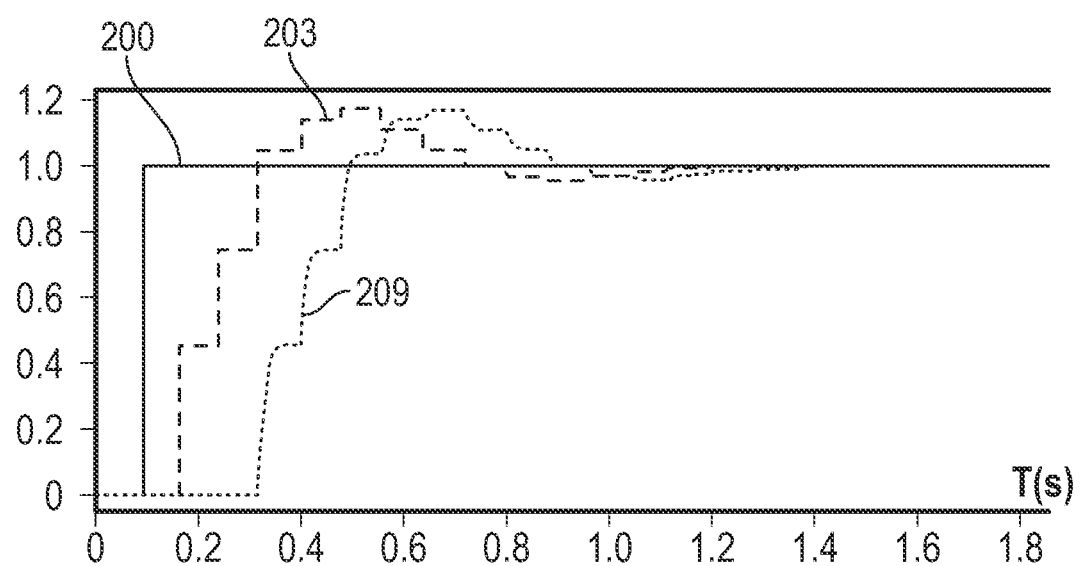

FIG. 3b shows a graph representing response to a change in reactive power reference for the renewable power plant of FIG. 3a. The reference 200 again defines a reactive power value which the power plant 100 needs to achieve within a predetermined time. The reference could also be a voltage, frequency response or active power value, but in this example a reactive power value is used. In this example, the predetermined time is set to be 1 sec, thus the renewable power plant needs to output at the 97% of the reactive power reference value within 1 sec as only 5% overshoot is allowed by a grid code. The graph shows three curves, curve 200 representing the reference, curve 203 representing the setpoints sent to the energy generating system of the second type 102, and curve 209 representing a response of the energy generating system of the second type 102 to the setpoints 203. The response 209 of the energy generating system of the second type 102 is used as a feedback signal measured by the power measurement device 205 and communicated to the feedback control loop algorithm 201. It can be seen that in this prior art scenario with the energy generating system introducing the time delay 206, the energy generating system of the second type 102 provides required reactive power within the required response time as defined by the reference 200. However, the response of the energy generating system of the second type 102 is overshooting nearly 20% with a damped oscillation within the response time of 1 sec as the time delay 206 is not compensated when the setpoints 203 are calculated. This happens because the setpoints 203 are directly calculated from the feedback signal 209 which already comprises the time delay 206. This is not compliant with the requirements mentioned above as an overshoot occurs, thus this control scheme does not fulfil the requirements of the electrical grid.

Figure 4A:
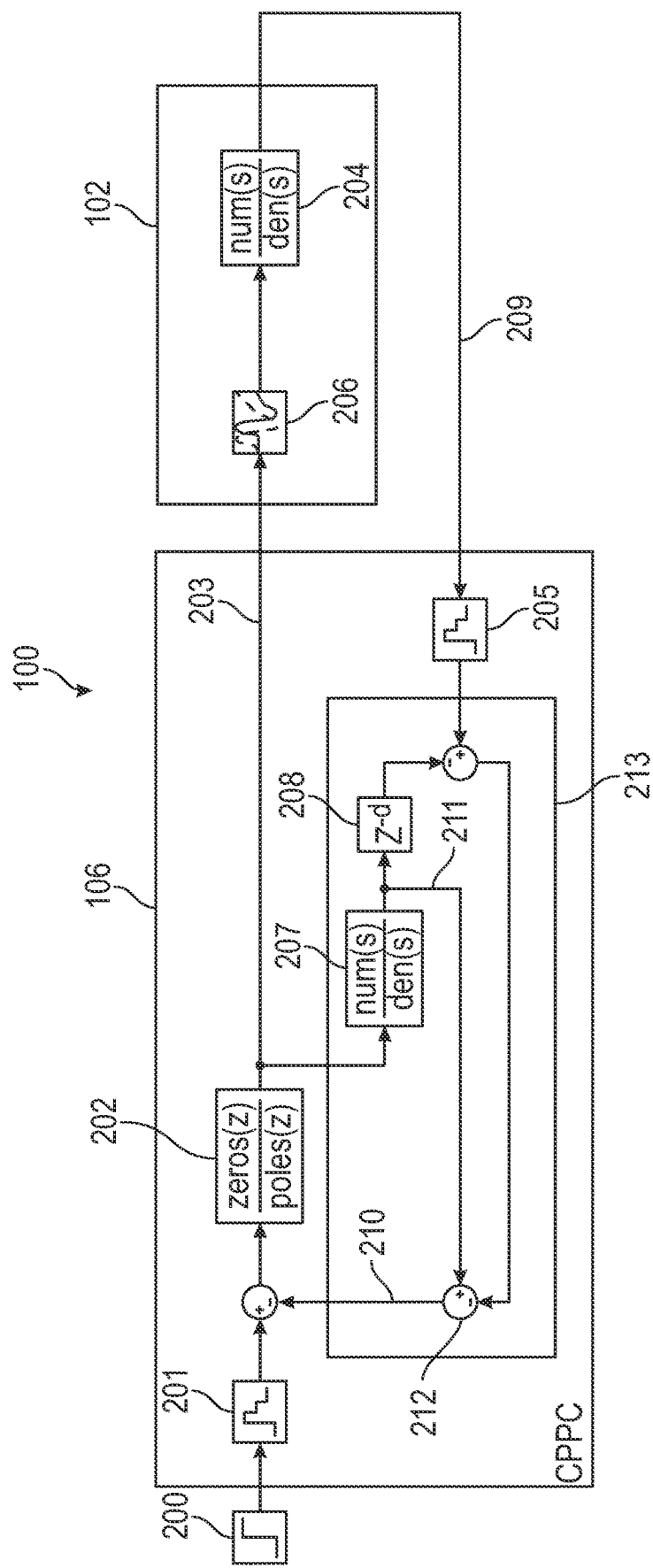

FIG. 4a shows a feedback control loop as a part of a renewable power plant 100 according to an embodiment of the present invention. Similar to the prior art described in FIG. 3, the renewable power plant 100 comprises a CPPC 106 and an energy generating system of a second type 102 which introduces a time delay 206. However, the present invention solves the problem of the prior art preventing the overshooting of the response.

The problem is solved by using a modified feedback signal 210 in which the time delay 206 is compensated for. The modified feedback signal 210 is generated based on the feedback signal 209 received from the energy generating system of the second type 102 obtained by a power measurement device 205 and using a model 207 representing operational behaviour of the energy generating system of the second type 102 as well as an estimated time delay 208. The model 207 representing operational behaviour of the energy generating system of the second type 102 uses setpoint 203 to generate an estimated feedback signal 211 which represents what the energy generating system of the second type 102 would provide in absence of the time delay 206 based on the given setpoint 203. The estimated feedback signal 211 is then provided to an addition node 212. Further, in a separate path, the estimated feedback signal 211 and the estimated time delay 208 are then multiplied in time domain and the obtained signal is then subtracted from the feedback signal 209. This difference 213 is then added to the estimated feedback signal 211 in the addition node 212 to obtain the modified feedback signal 210. The obtained modified feedback signal 210 then represents the feedback signal from the local controller 204 but without the time delay 206.

The CPPC 106 receives a reference 200 from a grid operator and a sampler 201 is communicating it further to a feedback control loop algorithm 202. The feedback control loop algorithm 202 also receives the modified feedback signal 210 described above. The feedback control loop algorithm 202 then calculates setpoints 203 which are communicated to the energy generating system of the second type 102. The setpoints 203 are received by a local controller 204 which controls the energy generating system of the second type 102.

Figure 4B:
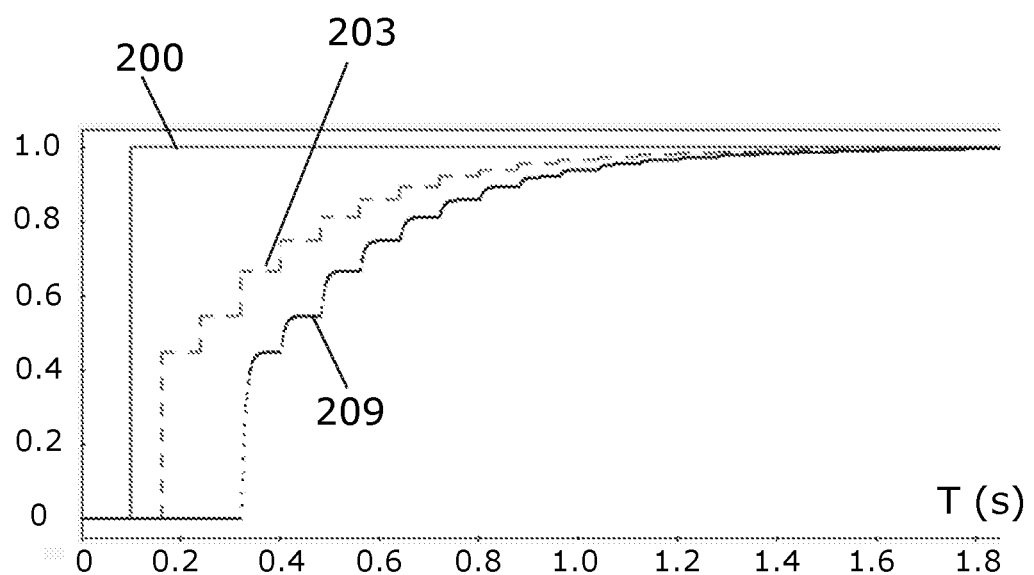

FIG. 4b shows a graph representing response to a change in reactive power reference for the renewable power plant of FIG. 4a. The reference 200 defines a reactive power value which the power plant 100 needs to achieve within a predetermined time and with a maximum overshoot. The maximum overshoot is normally defined in the requirements of the electrical grid and can for example be maximum 5% of the power reference. In this example, the predetermined time is set to be 1 sec, thus the renewable power plant needs to output at the 97% of the reactive power reference value within 1 second as exceeding the maximum overshoot is not allowed by the grid code. The graph shows three curves, curve 200 representing the reference, curve 203 representing the setpoints sent to the energy generating system of the second type 102, and curve 209 representing a response of the energy generating system of the second type 102 to the setpoints 203. It can be seen that the energy generating system of the second type 102 provides the required reactive power shown by curve 209 within the required response time as defined by the reference 200 and without exceeding the allowed maximum overshoot.

By using the CPPC 106 configured to generate the modified feedback signal 210, based on the feedback signal 209 and using the model 207 representing operational behaviour of the energy generating systems of the second type 102, and applying it to the feedback control loop algorithm 202 for controlling the energy generating system of the second type 102, the energy generating system of the second type 102 meets the requirements of the electrical grid. Additionally, there is no overshooting in the response from the energy generating system of the second type 102 or the overshoot is significantly reduced to an acceptable level as the time delay 206 is compensated in the feedback control loop algorithm which then generates modified setpoints 203 which encounter for the time delay 206.

The invention claimed is:

1. A renewable power plant configured to deliver electrical power to an electrical grid in accordance with a reference, the renewable power plant comprising:
   at least one energy generating system of a first type;
   at least one energy generating system of a second type, the energy generating systems of the first type and of the second type being configured to generate and deliver energy to the electrical grid;
   a control system comprising a central power plant controller (CPPC) communicating with the energy generating systems via a communication network, the CPPC being configured to generate setpoints for controlling the energy generating systems in accordance with the reference and to communicate the setpoints to the energy generating systems;

the energy generating systems being configured to generate feedback signals related to the energy generating systems and communicate them to the CPPC; and wherein the energy generating system of the second type introduces a time delay, the feedback signal originating from the energy generating system of the second type thereby comprising the time delay, wherein the control system is configured to generate a modified feedback signal based on the feedback signal received from the energy generating systems of the second type, and using a model representing operational behaviour of the energy generating systems of the second type, the modified feedback signal representing the feedback signal without the time delay, and wherein the CPPC is configured to apply the modified feedback signal to a feedback control loop for controlling the energy generating systems.

2. The renewable power plant according to claim 1, wherein the energy generating system of the first type comprises a wind turbine generator.

3. The renewable power plant according to claim 1 or 2, wherein the energy generating system of the second type comprises a photovoltaic generator.

4. The renewable power plant according to claim 1, wherein the energy generating system of the second type comprises at least one local controller, the local controller being configured to control the energy generating systems of the second type and being further configured to communicate with the CPPC via the communication network.

5. The renewable power plant according to claim 1, wherein the control system comprises a time delay predictor algorithm configured to determine the time delay based on the feedback signal received from the energy generating systems of the second type, preferably further based on the model representing operational behaviour of the energy generating systems of the second type.

6. The renewable power plant according to claim 1, wherein the reference includes at least one of a power reference, voltage reference, power factor reference, active power reference, or reactive power reference.

7. The renewable power plant according to claim 1, wherein the CPPC further calculates new setpoints for the at least one energy generating system of the second type.

8. The renewable power plant according to claim 1, wherein the time delay is a constant value.

9. The renewable power plant according to claim 1, wherein the CPPC is configured to apply the feedback signals received from the energy generating systems of the first type to the feedback control loop for controlling the energy generating systems of the first type.

10. A method for operating a renewable power plant configured to deliver electrical power to an electrical grid in accordance with a reference, the renewable power plant comprising:

at least one energy generating system of a first type;

at least one energy generating system of a second type, the energy generating systems of the first type and of the second type being configured to generate and deliver energy to the electrical grid;

a control system comprising a central power plant controller communicating with the energy generating systems via a communication network;

wherein a time delay is introduced by the energy generating system of the second type;

the method comprising the steps of:

the energy generating systems generating feedback signals related to the energy generating systems, the feedback signal originating from the energy generating systems of the second type comprising the time delay;

the energy generating systems communicating the feedback signals to the CPPC;

the control system generating a modified feedback signal based on the feedback signal received from the energy generating systems of the second type and using a model representing operational behaviour of the energy generating systems of the second type, the modified feedback signal representing the feedback signal without the time delay;

the CPPC applying the modified feedback signal to a feedback control loop for controlling the energy generating systems; and the CPPC generating setpoints for controlling the energy generating systems in accordance with the reference and communicating the setpoints to the energy generating systems.

11. The method of claim 10, further comprising:

the control system determining the time delay based on the feedback signal received from the energy generating systems of the second type, preferably further based on the model representing operational behaviour of the energy generating systems of the second type.

12. The method of claim 10, further comprising:

the CPPC applying the feedback signal received from the energy generating systems of the first type to the feedback control loop controlling the energy generating systems of the first type.

\* \* \* \* \*